(12) United States Patent
Fujita

(10) Patent No.: US 8,517,417 B2
(45) Date of Patent: Aug. 27, 2013

(54) AIRBAG APPARATUS

(75) Inventor: Takafumi Fujita, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/177,712

(22) Filed: Jul. 7, 2011

(65) Prior Publication Data

US 2012/0013109 A1    Jan. 19, 2012

(30) Foreign Application Priority Data

Jul. 13, 2010   (JP) ................................. 2010-158773

(51) Int. Cl.
   *B60R 21/16*   (2006.01)

(52) U.S. Cl.
   USPC ....................... 280/732; 280/743.1

(58) Field of Classification Search
   USPC ................. 280/730.1, 732, 743.1, 743.2
   See application file for complete search history.

(56) References Cited

U.S. PATENT DOCUMENTS

| | | | | |
|---|---|---|---|---|
| 6,042,144 | A * | 3/2000 | Murakami et al. | 280/732 |
| 6,299,202 | B1 * | 10/2001 | Okada et al. | 280/732 |
| 6,352,284 | B1 * | 3/2002 | Okada et al. | 280/743.1 |
| 6,619,691 | B1 * | 9/2003 | Igawa | 280/732 |
| 7,648,158 | B2 * | 1/2010 | Hasebe | 280/729 |
| 7,926,844 | B2 * | 4/2011 | Williams et al. | 280/743.1 |
| 2003/0197358 | A1 | 10/2003 | Hawthorn et al. | |
| 2003/0218325 | A1 * | 11/2003 | Hasebe et al. | 280/743.2 |
| 2004/0251669 | A1 * | 12/2004 | Fischer et al. | 280/743.1 |
| 2005/0110249 | A1 * | 5/2005 | Hasebe et al. | 280/729 |
| 2005/0161918 | A1 * | 7/2005 | Bito | 280/732 |
| 2006/0049618 | A1 | 3/2006 | Bito | |
| 2008/0054613 | A1 | 3/2008 | Narimoto et al. | |
| 2008/0122208 | A1 | 5/2008 | Fukawatase et al. | |

FOREIGN PATENT DOCUMENTS

| | | |
|---|---|---|
| JP | 2001-354097 A | 12/2001 |
| JP | 2002-187515 A | 7/2002 |
| JP | 2003-312423 A | 11/2003 |
| JP | 2006-103655 A | 4/2006 |
| JP | 2007-038812 A | 2/2007 |
| JP | 2007-045190 A | 2/2007 |
| JP | 2008-062710 A | 3/2008 |

* cited by examiner

*Primary Examiner* — Joseph Rocca
*Assistant Examiner* — Robert A Coker
(74) *Attorney, Agent, or Firm* — Fitch, Even, Tabin & Flannery, LLP

(57) ABSTRACT

An airbag apparatus is provided including an airbag which is formed as a bag body by connecting a plurality of panels via seaming and is folded and housed in an instrument panel, and an inflator, wherein: in one form the airbag includes: a multi-layered connecting portion that connects at least three layers of the panels; and a height regulating portion that regulates a dimension of a height direction of the airbag from an upper surface of the instrument panel in an initial stage of an inflation and deployment process of the airbag; and the multi-layered connecting portion is positioned further toward a vehicle rear than the height regulating portion, in a state where the airbag apparatus is mounted to a vehicle.

5 Claims, 6 Drawing Sheets

FIG. 4A
FIG. 4B
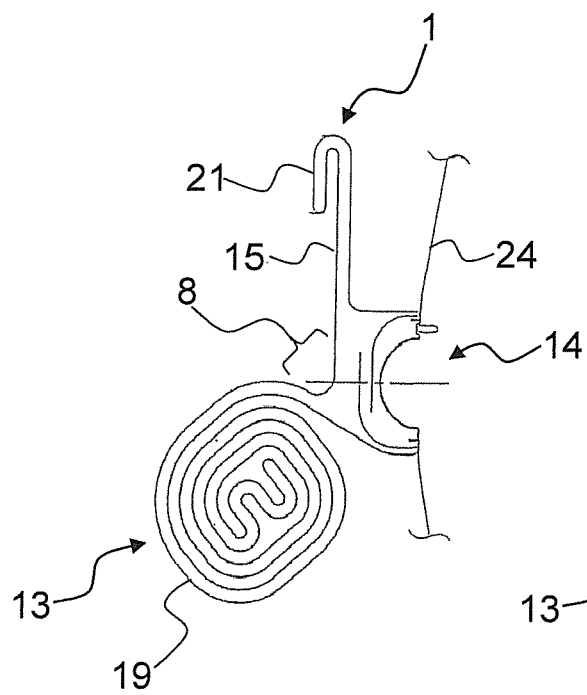
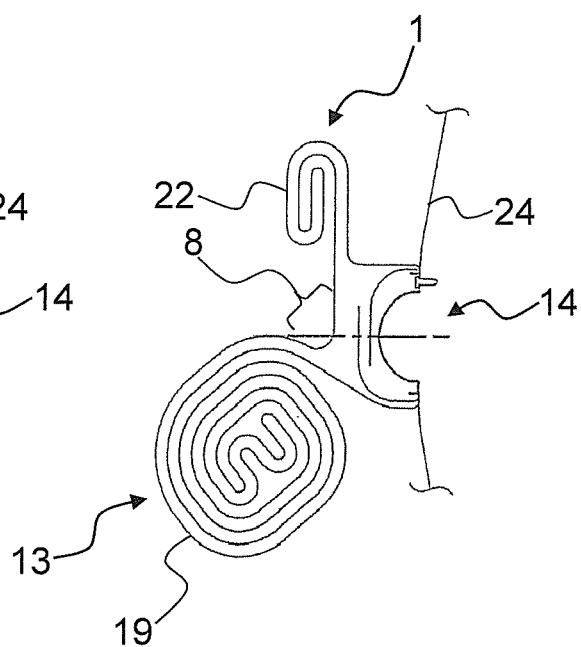

AIRBAG APPARATUS

CROSS-REFERENCE TO RELATED APPLICATION

This application claims priority under 35 U.S.C. §119 to Japanese Patent Application No. JP2010-158773 filed on Jul. 13, 2010, the entire content of which is hereby incorporated herein by reference in its entirety.

FIELD OF THE INVENTION

The present invention relates to an airbag apparatus comprising an inflator and an airbag that is folded and housed inside an instrument panel.

BACKGROUND OF THE INVENTION

Examples of airbags include an airbag that is folded and housed inside an instrument panel (hereinafter suitably "IP"). This airbag starts to inflate from the instrument panel upper surface when injected with high-pressure gas from the inflator, continues to inflate and deploy toward an occupant as it unfolds, and then is received by the occupant.

Known airbags of such a configuration include a so-called twin airbag that comprises a left airbag portion and a right airbag portion, and receives an occupant via a depression formed between the left and right airbag portions in an inflated and deployed state (see JP, A, 2008-62710, for example). This twin airbag is formed as a bag body wherein an outer panel and an inner panel are connected by a seam.

SUMMARY OF THE INVENTION

In general, an airbag is formed as a bag body wherein two panels are connected by a seam, and reinforcement panels are provided to predetermined locations as necessary. For example, when an airbag is housed inside the IP, sometimes a reinforcement panel is provided on the surface that is positioned on the windshield side at the time of inflation and deployment. When a reinforcement panel is provided in this manner, it is best to form a multi-layered connecting portion wherein at least three layers of panels are connected. Such a multi-layered connecting portion offers high rigidity compared to a regular connecting portion.

While the airbag of the above-described prior art is formed using an outer panel and an inner panel as described above, when a reinforcement panel is provided to the airbag, the possibility exists that the multi-layered connecting portion may be formed in a location that comes in contact with the windshield at the time of inflation and deployment. In such a case, the fear exists that the multi-layered connecting portion will contact the windshield with high momentum in the initial stage of the inflation and deployment process, applying an excessive load on the windshield due to its high rigidity. This has led to increased demand for a way to effectively avoid such a situation from the viewpoint of airbag safety improvement.

It is therefore an object of the present invention to provide an airbag apparatus that is capable of improving safety by preventing the multi-layered connecting portion from contacting the windshield in the initial stage of the inflation and deployment process.

In order to achieve the above-mentioned object, according to the first invention, there is provided an airbag apparatus comprising an airbag which is formed as a bag body by connecting a plurality of panels via seaming and is folded and housed in an instrument panel, and an inflator, wherein: the airbag comprises: a multi-layered connecting portion that connects at least three layers of the panels; and a height regulating portion that regulates a dimension of a height direction of the airbag from an upper surface of the instrument panel in an initial stage of an inflation and deployment process of the airbag; and the multi-layered connecting portion is positioned further toward a vehicle rear than the height regulating portion, in a state where the airbag apparatus is mounted to a vehicle.

The airbag of the airbag apparatus inflates and deploys as it unfolds from a folded state inside the instrument panel by the injection of high-pressure gas from the inflator. In this initial stage of the inflation and deployment process of the airbag (the inflation and deployment process up to the regulation of the dimension of a height direction of the airbag by the height regulating portion), the airbag first inflates upward (that is, toward the windshield) from the instrument panel top surface. Subsequently, the airbag inflates toward the rear side in the vehicle front-back direction, which is the occupant side.

At this time, the height regulating portion regulates the dimension of a height direction from the instrument panel top surface in the initial stage of the inflation and deployment process of the airbag. With this arrangement, the strong contact of the airbag with the windshield in the initial stage of inflation is suppressed, making it possible to subsequently smoothly inflate and deploy the airbag in the vehicle rearward direction. Then, the multi-layered connecting portion that connects at least three layers of panels is positioned in the vehicle rearward direction by the height regulating portion, thereby making it possible to prevent the multi-layered connecting portion from contacting the windshield in at least the initial stage in which the airbag inflates toward the windshield with high momentum. As a result, the load applied to the windshield is suppressed, thereby improving safety.

According to the second invention, in the airbag apparatus according to the first invention, the airbag in a folded and housed state comprises: a front folded portion positioned on a windshield side; and a rear folded portion positioned opposite the vehicle rear side of the front folded portion; the height regulating portion includes the front folded portion; and the multi-layered connecting portion is positioned between the front folded portion and the rear folded portion.

The airbag comprises a front folded portion and a rear folded portion. This airbag inflates as the front and rear folded portions unfold, with the inflation of the front folded portion ending first in the initial stage of the inflation and deployment process. Subsequently, the airbag inflates toward the occupant side as the folds of the rear folded portion unfold. With the completion of inflation of the front folded portion, the dimension of a height direction is regulated in the initial stage of the inflation and deployment process of the airbag. That is, the front folded portion functions as a height regulating portion. Then, the multi-layered connecting portion is positioned between the front folded portion and the rear folded portion. As a result, even if the multi-layered connecting portion contacts the windshield, the contact occurs along with the inflation and deployment of the rear folded portion after the dimension of a height direction of the airbag has been controlled in the initial stage, resulting in loss in momentum in the initial stage. This makes it possible to suppress the load applied to the windshield by the contact of the multi-layered connecting portion.

According to the third invention, in the airbag apparatus according to the second invention, the front folded portion of the airbag comprises a number of folds that is less than a number of folds of the rear folded portion.

When the two folded portions of the front and rear folded portions are provided to the airbag, the folded portion having the lower number of folds unfolds first. As a result, since the number of folds of the front folded portion is less than that of the rear folded portion, the degree to which the inflation and deployment of the front folded portion precedes that of the rear folded portion is increased. As a result, the function of the front folded portion as a height regulating portion is maintained, making it possible to further increase the reliability of the prevention of contact between the multi-layered connecting portion and the windshield in the initial stage of inflation and deployment.

According to the fourth invention, in the airbag apparatus according to the second invention, the front folded portion and the rear folded portion of the airbag each include a roll-shaped fold that rolls toward the vehicle rear side.

The folds used for the folded structure of the airbag mainly include a roll-shaped fold and an accordion fold. When a roll-shaped fold is employed, the direction of airbag deployment tends to be in the rolled direction. Inclusion of a roll-shaped fold wherein the front and rear folded portions are each rolled toward the vehicle rear makes it possible to establish front and rear folded portions that tend to deploy toward the vehicle rear side, thereby further increasing the effect of suppressing the load applied to the windshield. In particular, by having the rear folded portion include a roll-shaped fold that rolls toward the vehicle rear, it is possible to effectively deploy the airbag toward the occupant side, with the airbag deploying to the vehicle rear side after inflation of the front folded portion.

According to the fifth invention, in the airbag apparatus according to the first invention, the airbag is formed by connecting an outer panel and an inner panel via seaming, and comprises a left airbag portion and a right airbag portion; and the multi-layered connecting portion is a connecting portion that connects the outer panel and the inner panel with a reinforcement panel.

A so-called twin airbag that has left and right airbag portions is formed into a bag shape by connecting the outer panel and the inner panel via a seam. With such a twin airbag, a reinforcement panel is sometimes provided to the surface that is on the windshield side at the time of inflation and deployment. In such a case, in particular, a multi-layered connecting portion readily forms wherein at least three layers of panels are connected on the surface that is on the windshield side at the time of inflation and deployment. Here, with the application of the present invention to such a twin airbag, it is possible to prominently exhibit the advantages of the present invention, that is, suppress the load applied to the windshield and, thus, improve safety.

According to the present invention, it is possible to prevent the multi-layered connecting portion from contacting the windshield in the initial stage of the inflation and deployment process, thereby improving safety.

BRIEF DESCRIPTION OF THE DRAWINGS

FIG. 4 is a simplified view showing another part of the folding process of the twin airbag.

DETAILED DESCRIPTION OF THE PREFERRED EMBODIMENTS

Figure 1:
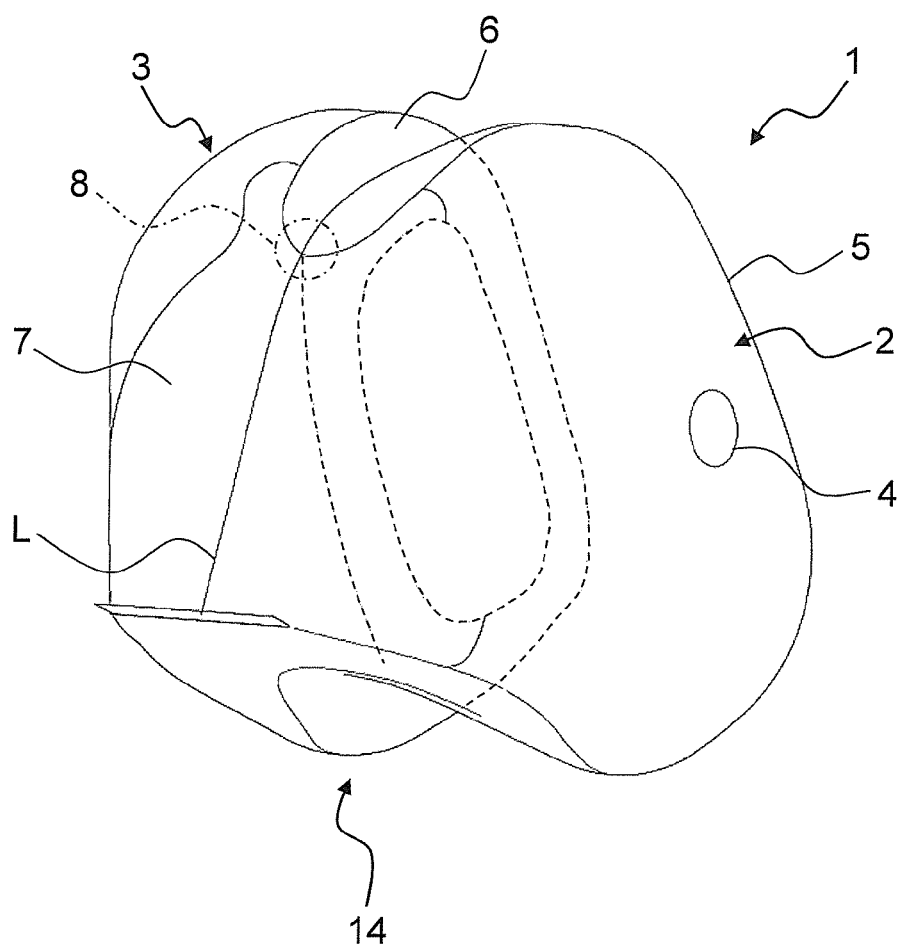
FIG. 1 is a perspective view showing the outer appearance of a twin airbag which serves as an embodiment of the present invention, after inflation and deployment.

FIG. 1 shows the outer appearance of a twin airbag 1 serving as an embodiment of an airbag that constitutes an airbag apparatus of the present invention, after inflation and deployment. The twin airbag 1 comprises a left airbag portion 2 and a right airbag portion 3 symmetrically formed on the left and right, each of which is provided with a vent hole 4 for discharging excess gas for inflation upon receipt by an occupant. Here, the terms "left," "right," "front," and "rear" in this embodiment refer to the left, right, front, and rear as viewed from an occupant seated in a vehicle where the twin airbag 1 is mounted.

The twin airbag 1 is formed into a bag body comprising the left and right airbag portions 2 and 3 by establishing an outer panel 5 and an inner panel 6 as the main panel elements, employing a reinforcement panel 7, and sewing these panels together in a predetermined order. The outer panel 5 mainly extends from each of the left and right side portions of the twin airbag 1 toward the rear, and forms a part of the inflated surfaces of both the left airbag portion 2 and the right airbag portion 3.

The inner panel 6 is sewn in a folded state at the horizontal center, and is connected to the outer panel 5 so that it is inserted between the left and right sides. This inner panel 6 extends from the top portion of the twin airbag 1 to the lower portion, crossing over the front portion, and forms a part of the inflated surface of the left airbag portion 2 and the right airbag portion 3. The reinforcement panel 7 is a panel for reinforcing the surface that is on the windshield side when the twin airbag 1 inflates and deploys, and overlaps the outer panel 5, covering the rear portion of the outer panel 5.

With the above configuration, a multi-layered connecting portion 8 wherein at least three layers of panels are connected via the stitching of the outer panel 5, the inner panel 6, and the reinforcement panel 7 is formed in the twin airbag 1 in an area near the top of the rear inflated surface. In this multi-layered connecting portion 8, the end portions of the overlapping outer panel 5 and the reinforcement panel 7, and the end portion of the inner panel 6 that abuts thereto are folded back inside the airbag and sewn in an overlapped state therein. Note that the connecting form of the multi-layered connecting portion 8 is not limited to the connection of three or more layers inside the airbag as described here, but may include the connection of three or more layers overlapped on the airbag front surface. A line L in FIG. 1 represents a center fold line for both the inner panel 6 and the reinforcement panel 7.

Figure 2:
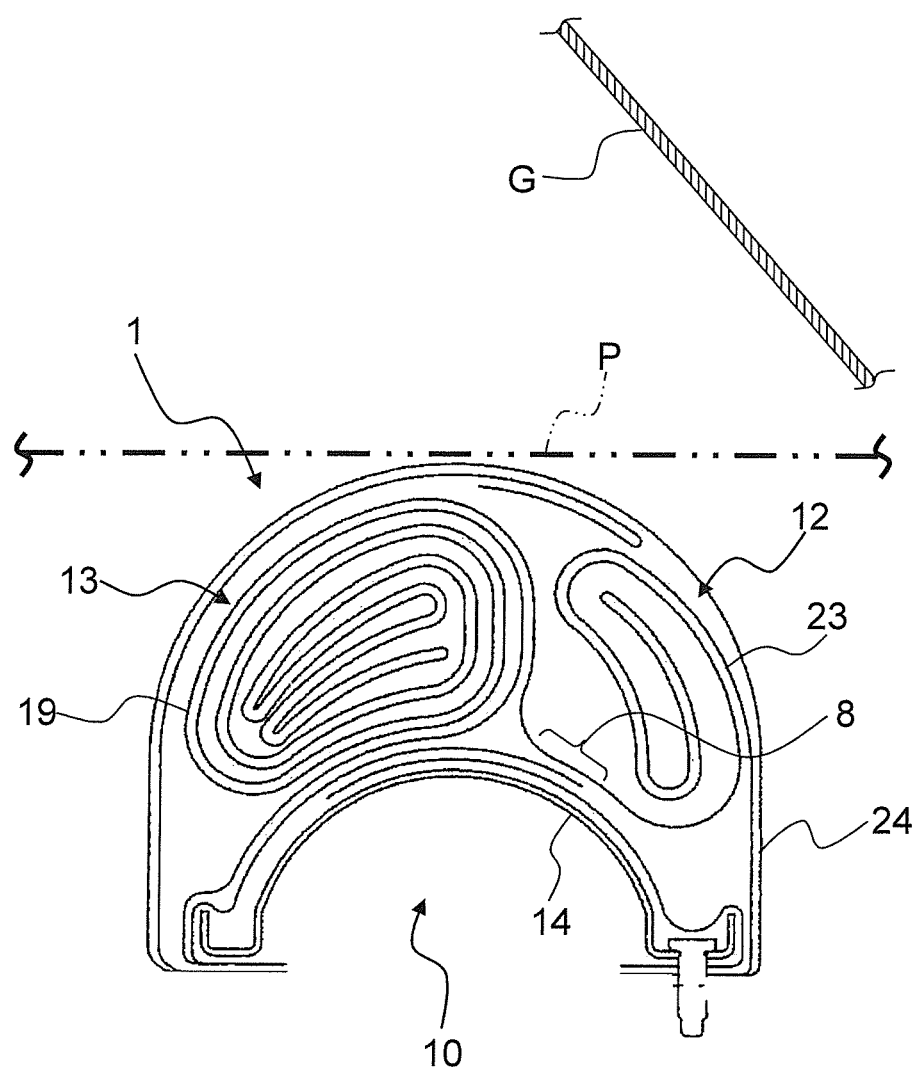
FIG. 2 is a simplified lateral cross-sectional view showing the folded structure of the twin airbag.

FIG. 2 shows a simplified view of the folded structure of the twin airbag 1, and illustrates the positional relationship between the twin airbag 1, an instrument panel (hereinafter suitably "IP") upper surface P, and a windshield G. Note that the structure used for housing the twin airbag 1 within the IP can be any known general structure, and a description thereof is omitted.

As shown in FIG. 2, an airbag apparatus 10 comprising an inflator (not shown) and the twin airbag 1 is housed in the IP. Folded and housed inside the IP, the twin airbag 1 comprises a front folded portion 12 positioned on the windshield G side (on the front side of the vehicle), and a rear folded portion 13 positioned opposite the rear side of this front folded portion 12. Then, the twin airbag 1 is folded so that the multi-layered connecting portion 8 is positioned between the front folded portion 12 and the rear folded portion 13.

Figure 3A:
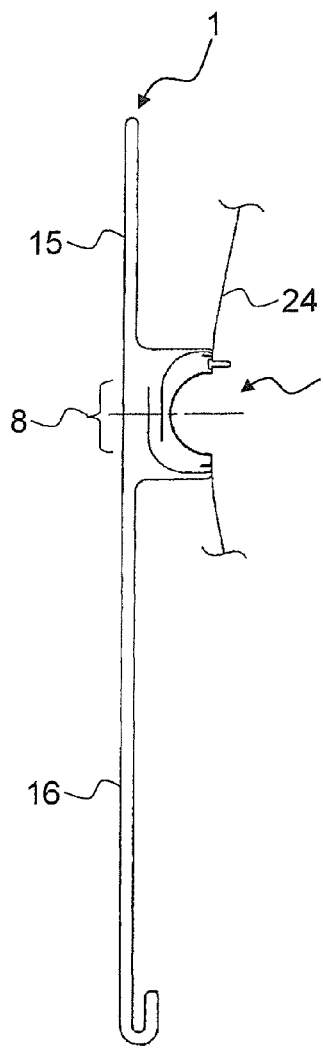
FIG. 3 is a simplified view showing a part of the folding process of the twin airbag.

FIGS. 3 to 5 show simplified views of the folding process of the twin airbag 1. FIG. 3A shows the twin airbag 1 in a preliminary folded state, as viewed from the side surface. This preliminary fold refers to a state in which a flattened twin airbag 1 is folded into a strip shape so that the rear inflated surface side is positioned on one end (the lower end in the state shown in FIG. 3) and the front inflated surface side is positioned on the other end (upper end in the state shown in FIG. 3). With this preliminary fold, a front strip portion 15 and a rear strip portion 16 are formed about a bag plate 14 for inflator insertion, with the length of the rear strip portion 16 two to three times longer than that of the front strip portion 15. At this time, the multi-layered connecting portion 8 is positioned in a location near the bag plate 14, between the front strip portion 15 and the rear strip portion 16.

Figure 3B:
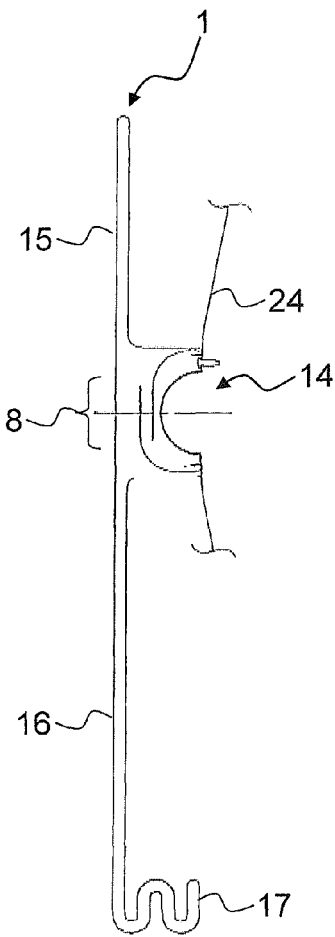
Figure 3C:
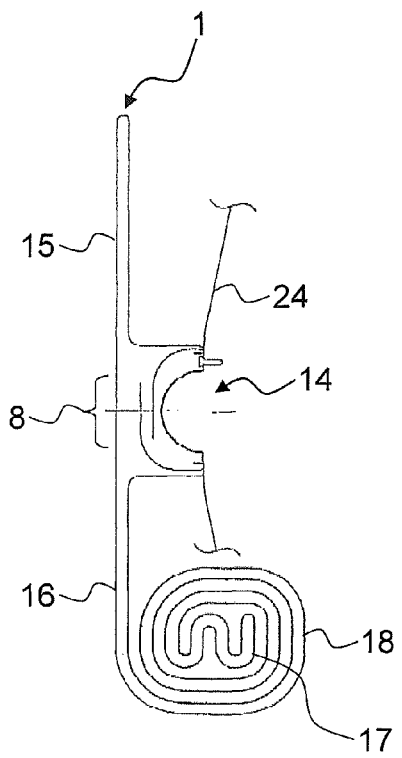

Such a preliminary folded state is used as the starting point for the folds used to form the front folded portion 12 and the rear folded portion 13. First, as shown in FIG. 3A, the tip end portion of the rear strip portion 16 is folded back at a predetermined width and, as shown in FIG. 3B, an accordion folded portion 17 that forms an accordion fold having a predetermined number of folds (three in this example) is formed at the tip end portion of the rear strip portion 16. Next, as shown in FIG. 3C, the accordion fold 17 is rolled inward to form a roll-shaped fold of a predetermined number of folds, a roll-shaped folded portion 18 is then formed into the rear strip portion 16 of the intermediate stage and, as shown in FIG. 4A, the roll-shaped folded portion 18 is further rolled to a position on the bag plate 14, thereby forming in the end a roll-shaped folded portion 19, which completes the rear folded portion 13. Note that, when the twin airbag 1 is, in the end, folded and housed in the IP, the folds of the roll-shaped folded portions 18 and 19 form a roll-shaped fold that rolls toward the vehicle rear side (the lower side in FIG. 3 and FIG. 4; the left side in FIG. 5).

Figure 5A:
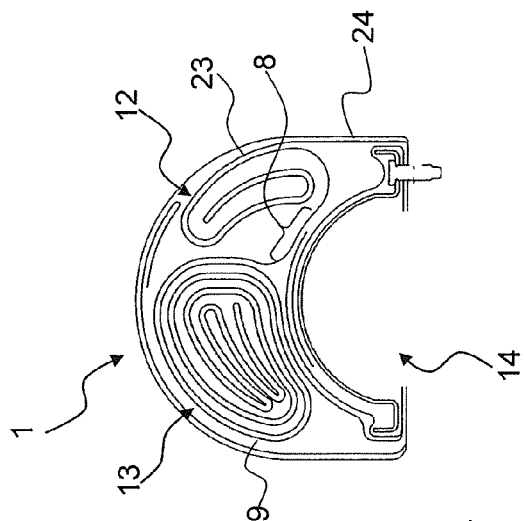
FIG. 5 is a simplified view showing yet another part of the folding process of the twin airbag.

Once the rear strip portion 16 is folded as described above, the front strip portion 15 is folded. First, as shown in FIG. 4A, the tip end portion of the front strip portion 15 is folded at a predetermined width to form a folded portion 21, and subsequently, as shown in FIG. 4B, the folded portion 21 is rolled inward to form a roll-shaped fold having a predetermined number of folds and a roll-shaped folded portion 22 of the intermediate stage is formed into the front strip portion 15. Furthermore, as shown in FIG. 5A, the roll-shaped folded portion 22 is further rolled so that it is positioned on the bag plate 14, thereby forming in the end a roll-shaped folded portion 23, which completes the front folded portion 12. Note that, when the twin airbag 1 is, in the end, folded and housed in the IP, the folds of the roll-shaped folded portions 22 and 23 form a roll-shaped fold that rolls toward the vehicle rear side (the lower side in FIG. 3 and FIG. 4; the left side in FIG. 5), similar to the above roll-shaped folded portions 18 and 19.

Figure 5B:
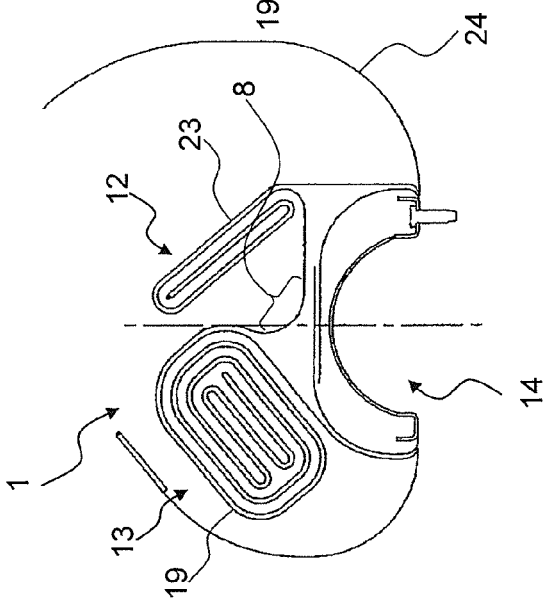
Figure 5C:
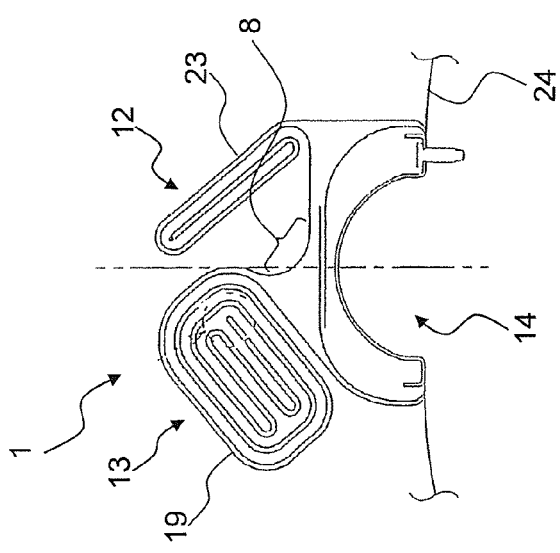

Once the front folded portion 12 and the rear folded portion 13 are completed as described above, the twin airbag 1 is wrapped in a protector cloth 24 installed to the bag plate 14 as shown in FIG. 5B and FIG. 5C, and held in a folded state by that protector cloth 24.

While the front folded portion 12 and the rear folded portion 13 are completed as described above, the number of folds (number of rolls) of the roll-shaped folded portion 23 that constitutes the front folded portion 12 is less than the number of folds (number of rolls) of the roll-shaped folded portion 19 that constitutes the rear folded portion 13, and the multi-layered connecting portion 8 is positioned between the front folded portion 12 and the rear folded portion 13 in the final folded state of the front folded portion 12 and the rear folded portion 13, as shown in FIG. 5.

Figure 6A:
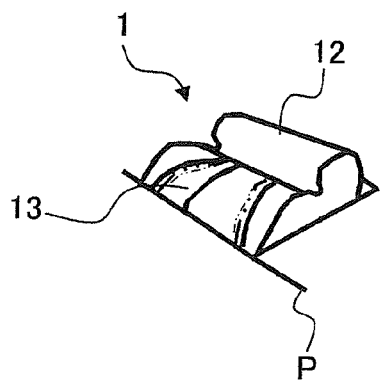
FIG. 6 is a view illustrating a state of inflation and deployment of the twin airbag.

Next, the inflation and deployment of the twin airbag 1 having the configuration and folded structure as described above will be explained. FIG. 6 shows a simplified view of a state of inflation and deployment of the twin air bag 1. The twin air bag 1 inflates upward from the IP upper surface P (that is, toward the windshield G) when injected with high-pressure gas from the inflator (not shown). FIG. 6A shows the state at this time, where the lid body (not shown) provided to the IP upper surface P is released and the twin airbag 1 starts to inflate from the IP upper surface P. At this time, the twin airbag 1 inflates as both the front folded portion 12 and the rear folded portion 13 unfold, with the inflation and deployment of the front folded portion 12 preceding that of the rear folded portion 13 since the number of folds of the front folded portion 12 is less than that of the rear folded portion 13 as described above.

Figure 6B:
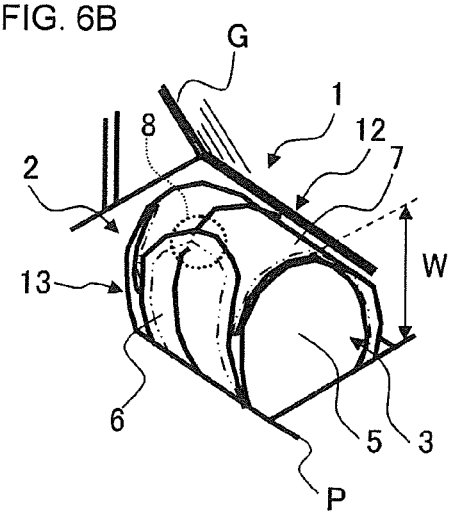

As inflation and deployment proceeds from the state shown in FIG. 6A, the front folded portion 12 finishes inflation before the rear folded portion 13, as shown in FIG. 6B. According to this embodiment, the inflation and deployment process of the twin airbag 1 up to the end of inflation of the front folded portion 12 is referred to as the "initial stage." As the front folded portion 12 completes inflation, a dimension of a height direction W is regulated in the initial stage of the inflation and deployment process of the twin airbag 1. That is, the front folded portion 12 functions as a height regulating portion. Note that while the dimension W is established by the length of the front strip portion 15 previously described, the value is set substantially equal to the dimension from the IP upper surface P of the position of the front folded portion 12 to the windshield G according to this embodiment. Then, as previously described, the multi-layered connecting portion 8 is positioned between the front folded portion 12 and the rear folded portion 13 (in other words, the multi-layered connecting portion 8 is positioned more toward the vehicle rear than the front folded portion 12 which serves as the height regulating portion), thereby preventing contact between the multi-layered connecting portion 8 and the windshield G in the initial stage of the inflation and deployment process.

Figure 6C:
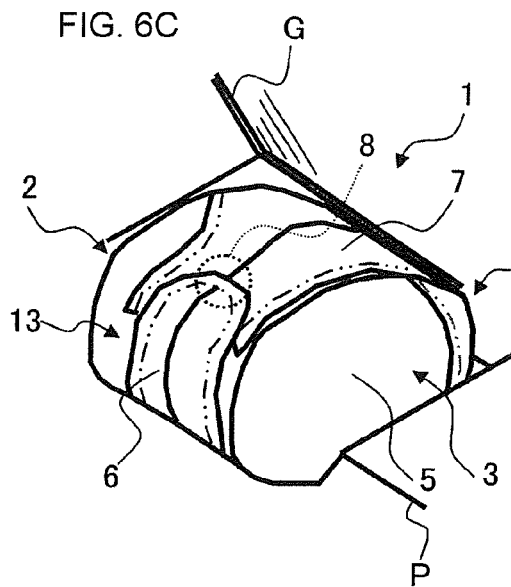

In this manner, the inflation of the front folded portion 12 and the initial stage of the inflation and deployment process come to an end, and inflation and deployment in the rearward direction, that is, toward the occupant, becomes the main process. That is, as shown in FIG. 6C, the process proceeds to inflation and deployment of the rear folded portion 13. At this time, the rear folded portion 13 is formed by a roll-shaped fold that rolls toward the vehicle rear side as previously described, and thus the twin airbag 1 effectively deploys toward the occupant.

Figure 6D:
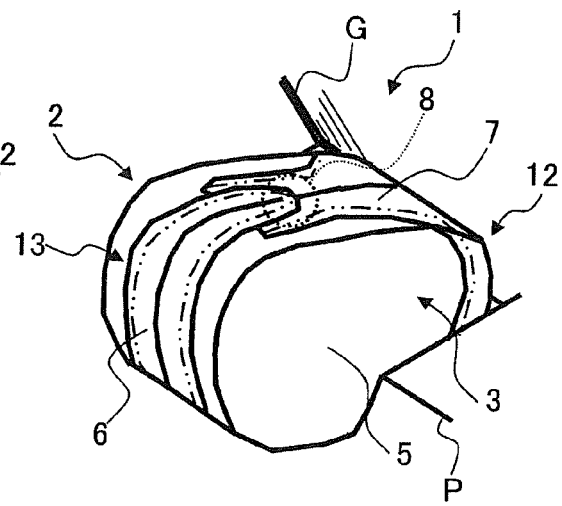
Figure 6E:
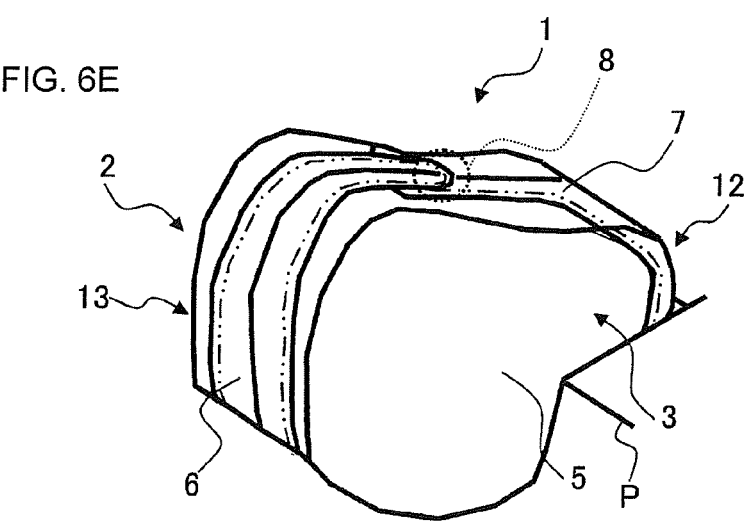

As inflation and deployment proceeds further from the state of FIG. 6C, the final inflated and deployed state shown in FIG. 6E is achieved via the state shown in FIG. 6D. In this process, while the inflated surface of the upper side of the twin airbag 1, which includes the multi-layered connecting portion 8, contacts the windshield G, this contact occurs after the height direction dimension of the twin airbag 1 is regulated in the initial stage, resulting in a loss in momentum in the initial stage. Thus, the load applied to the windshield G by the contact of the multi-layered connecting portion 8 is suppressed.

In the above-described embodiment, the front folded portion 12 regulates the dimension W from the IP upper surface P in the initial stage of the inflation and deployment process of the twin airbag 1. With this arrangement, the strong contact between the twin airbag 1 and the windshield G in the initial stage of inflation is suppressed, making it possible to subsequently smoothly inflate and deploy the twin airbag 1 in the vehicle rearward direction. Then, the multi-layered connecting portion 8 is positioned further on the vehicle rear side than the front folded portion 12, making it possible to prevent, at the very least, the multi-layered connecting portion 8 from contacting the windshield G in the initial stage when the twin airbag 1 inflates with high momentum on the windshield G side. As a result, the load applied to the windshield G is suppressed, thereby improving safety.

Further, in particular, according to this embodiment, the twin airbag 1 comprises the front folded portion 12 and the rear folded portion 13 in a folded and housed state, and the multi-layered connecting portion 8 is positioned between the front folded portion 12 and the rear folded portion 13. As a result, even if the multi-layered connecting portion 8 contacts the windshield G, the contact occurs along with the inflation and deployment of the rear folded portion 13, after the front folded portion 12 unfolds and the dimension W of the twin airbag 1 is regulated in the initial stage, resulting in loss in momentum in the initial stage. Thus, the load applied to the windshield G by the contact of the multi-layered connecting portion 8 is suppressed.

Further, in particular, according to the embodiment, the number of folds of the front folded portion 12 is less than that of the rear folded portion 13. With this arrangement, it is possible to increase the degree to which the inflation and deployment of the front folded portion 12 precedes that of the rear folded portion 13. As a result, the function of the front folded portion 12 as a height regulating portion is maintained, making it possible to further increase the reliability of the prevention of contact between the multi-layered connecting portion 8 and the windshield G in the initial stage of inflation and deployment.

Further, in particular, according to this embodiment, the front folded portion 12 and the rear folded portion 13 each include a roll-shaped fold that rolls toward the vehicle rear. With this arrangement, it is possible to keep the deployment direction of the front folded portion 12 and the rear folded portion 13 toward the vehicle rear, thereby further increasing the effect of suppressing the load applied to the windshield G. In particular, by having the rear folded portion 13 include a roll-shaped fold that rolls toward the vehicle rear, it is possible to effectively deploy the twin airbag 1 toward the occupant, with the twin airbag 1 deploying toward the vehicle rear after inflation of the front folded portion 12.

Further, in particular, according to this embodiment, the present invention is applied to the twin airbag 1 having the left airbag portion 2 and the right airbag portion 3. Structurally, the twin airbag 1, in particular, readily forms a multi-layered connecting portion 8 that connects at least three panel layers on the surface that is on the windshield G side when inflated and deployed. Here, by applying the present invention to such the twin airbag 1, it is possible to prominently exhibit the advantages of the present invention, that is, suppress the load applied to the windshield G and, thus, improve safety.

Although this invention has been described merely by way of example using the embodiment described above, it is appreciated that various embodiments may be implemented without departing from the spirit or scope of the invention. For example, while the above has described an illustrative scenario in which the airbag is a twin airbag, the present invention may be applied to airbags other than twin airbags, as long as the airbag comprises a multi-layered connecting portion that connects at least three panels.

What is claimed is:

1. An airbag apparatus comprising an airbag which is formed as a bag body by connecting a plurality of panels via seaming and is folded and housed in an instrument panel, and an inflator, wherein:
    said airbag comprises:
    a multi-layered connecting portion that connects at least three layers of said panels; and
    a height regulating portion that regulates a dimension of a height direction of said airbag from an upper surface of said instrument panel in an initial stage of an inflation and deployment process of said airbag; and
    said multi-layered connecting portion is positioned further toward a vehicle rear side than said height regulating portion, in a state where said airbag apparatus is mounted to a vehicle, and
    said airbag in a folded and housed state comprises:
    a front folded portion positioned on a windshield side; and
    a rear folded portion positioned opposite said windshield side of said front folded portion;
    said height regulating portion includes said front folded portion; and
    said multi-layered connecting portion is positioned between said front folded portion and said rear folded portion.

2. The airbag apparatus according to claim 1, wherein:
    said front folded portion of said airbag comprises a number of folds that is less than a number of folds of said rear folded portion.

3. The airbag apparatus according to claim 1, wherein:
    said front folded portion and said rear folded portion of said airbag each include a roll-shaped fold that rolls toward said vehicle rear side.

4. The airbag apparatus according to claim 1, wherein:
    said airbag is formed by connecting an outer panel and an inner panel via seaming, and comprises a left airbag portion and a right airbag portion; and
    said multi-layered connecting portion is a connecting portion that connects said outer panel and said inner panel with a reinforcement panel.

5. An airbag apparatus comprising an airbag which is formed as a bag body by connecting a plurality of panels via seaming and is folded and housed in an instrument panel, and an inflator, wherein:
    said airbag comprises:
    a multi-layered connecting portion that connects at least three layers of said panels; and
    a height regulating portion that regulates a dimension of a height direction of said airbag from an upper surface of said instrument panel in an initial stage of an inflation and deployment process of said airbag; and
    said multi-layered connecting portion is positioned further toward a vehicle rear side than said height regulating portion, in a state where said airbag apparatus is mounted to a vehicle, wherein
    said airbag in a folded and housed state comprises:
    a front folded portion positioned on a windshield side; and
    a rear folded portion positioned opposite said windshield rear side of said front folded portion;
    said height regulating portion includes said front folded portion; and
    said multi-layered connecting portion is positioned between said front folded portion and said rear folded portion,
    said front folded portion of said airbag comprises a number of folds that is less than a number of folds of said rear folded portion, said front folded portion and said rear folded portion of said airbag each include a roll-shaped fold that rolls toward said vehicle rear side, said airbag is formed by connecting an outer panel and an inner panel via seaming, and comprises a left airbag portion and a right airbag portion; and said multi-layered connecting portion is a connecting portion that connects said outer panel and said inner panel with a reinforcement panel, and said connecting portion is positioned at a contact side of an upper portion of said left airbag portion and said right airbag portion, the contact side contacting with said windshield in a final inflated and deployed state.

* * * * *